July 13, 1937.　　T. M. FIKE ET AL　　2,086,709
DELAYED ACTION SWITCH
Filed May 1, 1935
Fig. 1.
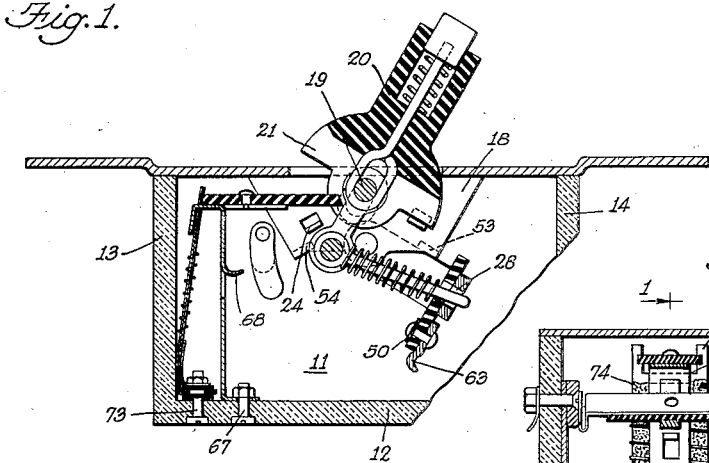
Fig. 4.
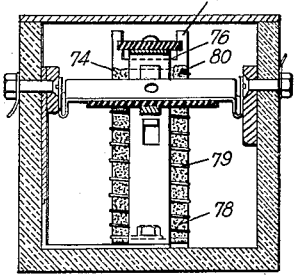
Fig. 2.
Fig. 5.
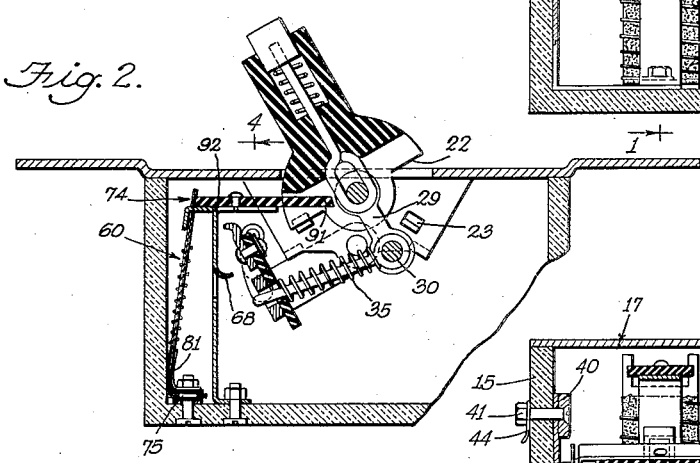
Fig. 3.
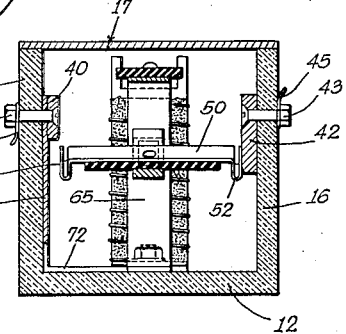
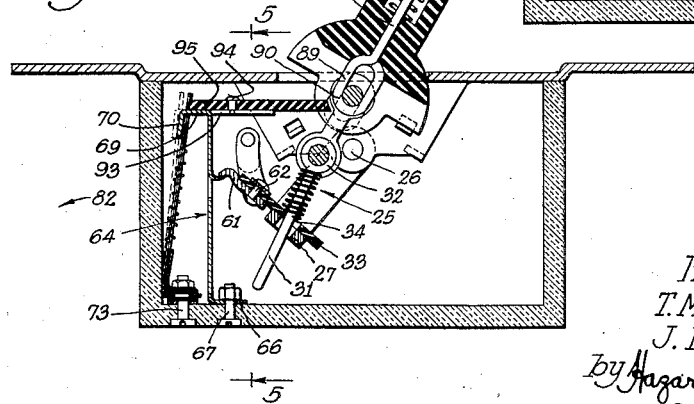
Inventors
T. M. Fike
J. Buxton
by Hazard and Miller
Attorneys.

Patented July 13, 1937

2,086,709

UNITED STATES PATENT OFFICE 2,086,709

DELAYED ACTION SWITCH

Thomas M. Fike and Jay Buxton, Hawthorne, Calif.

Application May 1, 1935, Serial No. 19,217

15 Claims. (Cl. 200—116)

Our invention relates to a time delay action electric switch suitable for light circuits, this being of a type in which when the switch is actuated to the open circuit position the main circuit is held closed for a predetermined time, and after such time the main circuit is automatically opened. This type of switch allows a person to manually actuate the switch to extinguish lights, but these will remain illuminated for the predetermined time period.

In the above type of switch, a main object and feature of our invention is the employment of a thermostat preferably of bi-metallic type, of a character which when the strip becomes heated, it is deflected and releases the manually controlled switch for a further automatic movement to completely open the circuit.

Another object and feature of our invention is the employment of a heating coil, preferably wrapped around a thermostatic strip and having an electrical connection whereby when the manually operated part of the switch is moved to the open circuit position, an automatically operating part opens one circuit and closes another by-pass circuit through the heating coil. Then on the deflection of the thermostatic strip, the secondary circuit or connection through the heating coil is automatically opened and the automatic control part of the manually operated switch then swings or moves to its full open circuit position. Then the various parts of the switch resume their normal open or off position for again closing the switch.

Another object and feature of our invention is in mounting and connecting the thermostatic strip to move or deflect a catch; this catch being operative to engage a detent on the automatically moving part of the manually controlled switch. The catch and detent have the function of establishing the secondary circuit through the heating coil. After the lapse of a predetermined time, the thermostat then is heated to the proper temperature and it automatically moves the catch out of engagement with the detent and allows a further movement of the detent to its full open circuit position.

Another object and feature of our invention is employing in connection with the manually operated switch, a bridging contact, which in the closed circuit position closes a first or main circuit of the switch and, when the manually operable part of the switch is moved to the open circuit position, a slight movement is given to the bridging piece and thus establishing a bypass secondary circuit through the heating coil to the lamp or other appliance; the bridging piece being held in this secondary or by-pass circuit until the thermostatic control operates to release a detent from a catch. The switch is of a type which is provided with an automatic actuator for moving the bridging piece to its full open circuit position. Our invention utilizes the detent and catch as part of the secondary circuit in connection with the bridging piece to the heating coil surrounding the thermostatic strip. The control of the hook and detent is such as to give a quick opening and thereby reduce the danger of sparking on opening of the delayed action part of the switch.

In more detail, an object and feature of our invention is the employment of a toggle type of switch having a pivoted lever which is manually operable and a pivoted yoke carrying the bridging piece and the detent; this yoke being shifted from the open to the closed circuit position and vice versa, by the actuation of a toggle arm having a spring on the operation of the finger operated lever. In this construction of a standard switch modified to incorporate our invention, the delay action is operated by utilizing a thermostatic strip secured to one end and having a deflectable free end, this strip being wound with a heating coil properly insulated therefrom. A deflectable catch is positioned to normally engage the detent attached to the pivoted yoke and restrain the movement of the yoke and the toggle arm from a partially open to a full open position.

Another object and feature of our invention is a device employed in connecion with the manually operated lever or movable part of the switch, to positively displace the thermostatic strip and the catch and thereby allow a substantially instantaneous or quick action of the automatic part of the switch to give a quick opening, thus causing the switch to operate with the same rapidity as an ordinary push button or lever operated switch. The delay action may be manually terminated instantaneously at any fraction of time during the delay period.

In more detail, a further object of our invention in connection with the manually controlled escapement of the catch and the detent, is by employing a push button mounted to move axially in the finger operated lever switch. This push button engages and actuates an insulating strip or rod which rod positively displaces the thermostatic strip in the direction it normally moves when heated and thus causes the strip to displace the catch out of the path of the moving detent, which detent as above mentioned is connected to the swinging yoke.

Our invention is illustrated in connection with the accompanying drawing, in which Fig. 1 is a longitudinal section of an electric switch and may be considered as taken substantially on the line 1—1 of Fig. 4 in the direction of the arrows, certain elements in the plane of the section being shown in elevation. This figure shows the switch in the open circuit position.

Fig. 2 is a section similar to Fig. 1, showing the switch in the standard or conventional closed circuit position.

Fig. 3 is a section similar to Figs. 1 and 2, showing the switch actuating lever in the open circuit position and the automatically operating circuit closing and opening elements of the switch shown in the position for establishing the secondary circuit through the thermostat control.

Fig. 4 is a transverse section of the switch substantially on the line 4—4 of Fig. 2 in the direction of the arrows, to illustrate the contacts in the normal or conventional closed circuit position.

Fig. 5 is a transverse section of the switch on the line 5—5 of Fig. 3 in the direction of the arrows, showing elements of the switch forming the contacts to establish the secondary circuit through the thermostat control.

In our invention we employ a more or less standard or conventional type of switch box 11 which is illustrated as being formed of insulating material such as porcelain and having a base or floor 12, ends 13 and 14 and sides 15 and 16 and being closed at the open top by a plate 17. This type of switch has a pair of plates 18 spaced apart and usually secured to the cover 17. A pivot shaft 19 is mounted in these plates and mounted on the shaft there is a finger operated insulating lever 20. This lever has a central cutout section 21 at its inner end surrounding the pivot shaft and has bottom edges 22 which are adapted to engage the two stops 23 and 24 on the plates 18 and thus limit the oscillating motion of the finger operated lever 20.

The conventional toggle for giving the automatic make and break of the circuit includes a yoke 25 mounted at its upper end on pivots 26 on the plates 18. The yoke has a transverse end 27 with a perforation 28. Securely attached to the finger lever 20 or to the shaft 19 to oscillate therewith, there is an extension arm 29 having a pivot pin 30 at its end and mounted on this pivot pin there is a toggle arm 31 in the form of a rod having an eye 32 encircling the pivot 30. The toggle rod or arm extends through the perforation 28 in the end 27 of the yoke. Secured to the end 27 of the yoke there is an insulating plate 33 having a perforation 34 through which the toggle arm extends and a compression spring 35 is coiled on the toggle arm and bears against the insulating plate 33 and the eye 32. This is a conventional arrangement for giving an automatic quick movement to the yoke when the finger operated lever 20 is moved from the open circuit position of Fig. 1 to the closed circuit position of Fig. 2; the yoke automatically swinging in a reverse direction to the lever 20.

In connection with our invention we provide an electric contact 40 secured by a terminal screw 41 to one side of the box 11, this being illustrated as attached to the side 15. A second contact 42 is attached by a terminal screw 43 to the other side of the box, this being illustrated as the side 16. Connected to these terminal screws there are the lead wires 44 and 45 which are in the circuit to be controlled, this being usually a lighting circuit where our switch is used to give a delayed action in the extinguishing of the lights. The contact 42 is of greater length than the contact 40.

A conducting bridging strip 50 is secured to the insulating plate 33 and has resilient brush ends 51 and 52. These are positioned to engage the fixed contacts 40 and 42 when the switch is in the closed circuit position and to engage only the contact 42 when the switch is in the position for the delayed action through the secondary circuit hereinunder described in detail. The limit to the movement of the toggle is by controlling the movement of the yoke; this yoke engaging fixed stops 53 and 54 on the lower edge of the plates 18.

The type of switch so far described is of a type in which, for instance, when the finger grip lever 20 is moved from the open switch position of Fig. 1 to the closed switch position of Fig. 2, the reversal of the positions of the pivot pins 30 relative to 26, causes the quick movement of the yoke and hence the bridging piece from the open to the closed circuit position, forming a connection through the contacts 40 and 42. The reverse movement of the lever 20 gives also a quick opening of the circuit. With these features we employ our delayed action assembly designated generally by the numeral 60. This employs a conducting detent 61 which is secured to the insulating strip 33 by a rivet 62; this rivet also passing through the bridging strip 50. The detent has a slightly bent end 63. A flexible bracket 64 is formed of a strip of conducting metal 65 having a foot 66 secured by a screw 67 to the base 12 of the switch box. This bracket has an outwardly bent catch 68 formed by cutting slits in the metal of the strip 65 and bending the central part of the strip towards the detent. The upper end of the bracket has a bentover end 69 with a downwardly extending finger 70 at the free end.

A conducting strap 71 is attached at its upper end to the contact 40 and thus to the terminal 41 and the electric lead 44 and extends downwardly inside of the box along the inside of the wall 15 and then has a floor strip 72 extending along the floor 12 of the switch box and is secured by a bolt 73. This bolt also attaches a thermostat strip 74 which is formed of bi-metallic metal and has a base or attachable end 75 also secured by the bolt 73 but insulated from this bolt and insulated from the base end 72 of the conductor 71. The thermostat strip has a slot 76 at the top with a pair of upwardly extending fingers 77 through which extends the bentover section 69 and the end finger 70 of the strip forming the bracket 64. The thermostat strip has an electric insulating cover 78 and on this covering there is a coil of heating wire 79 connected at 80 at the top to the thermostat strip and at the bottom having a lead 81 to the bolt 73. This lead is insulated from the lower clamped end of the thermostat strip.

The operation and function of the delayed action portion of the switch is substantially as follows: Presuming the switch is in the closed circuit position of Fig. 2, the bridging piece forms a connection between the fixed contacts 40 and 42 which are respectively connected to the electric leads 44 and 45 and thus the circuit to the lamp or other device is closed. When the finger lever 20 is rotated on its pivot from the closed circuit position of Fig. 2 to the closed circuit position of Fig. 3, the reversal of the position of the pivot 30 in reference to the pivot 26, swings the yoke 25 of the toggle assembly downwardly but the detent 61 engages the catch 68 of the bracket 64 and thus restrains the toggle from its automatic movement to the open circuit position.

A secondary or by-pass circuit is thus formed through the contact 42 which as above mentioned is of greater length than the contact 40, the brush 52, the bridging piece 50, rivets 62, detent 51, the bracket strip 64, the bentover end 69 and the fingers 70 to the upper end of the thermostat strip 74. Then by means of the connection 80 at one end, the heating winding 79, the lead 81 to the bolt 73 and thence to the conductor 71 having the foot 72 and thus to the opposite contact 40 and to the electric lead 44. Hence there is a secondary circuit established through the lamp or other appliance in circuit with the switch.

The action of the heating coil 79 is to heat the thermostat strip and cause this to flex in the direction of the arrow 82 of Fig. 3. The upper end of the thermostat strip thus pulls on the finger 70 of the bracket 64 and deflects this bracket to disengage the catch 68 of the bracket from the detent 61 on the automatically movable part of the switch, which part being connected to the yoke 25 on release is immediately rotated to its full open circuit position of Fig. 1. The time required to heat the thermostat strip to the proper temperature to cause the desired flexure may be predetermined, the time the secondary circuit is closed may thus be predetermined. Of course, there is a short interval of time between the breaking of the circuit by the brush 51 on the contact 40 and the engagement of the detent 60 with the catch 69, but this is insufficient to cause extinguishing of the lamp. Thus after the manually controlled lever 20 of the switch is moved from its closed to its open circuit position, the lamp or other appliance in the circuit may be energized for a predetermined period of time.

The manual release of the timed delay control is as follows: The finger operated lever 20 is provided with a socket 85 in which operates a push button 86 having a stem 87. The button is normally pressed outwardly by a compression spring 88. The stem has an elongated eye 89 which surrounds the main pivot shaft 19 of the lever 20. This eye thus has a lower contact end 90. This contact end when the lever 20 is in the position of Fig. 3 and on downward pressure on the bottom 86, engages the end 91 of an insulating strip 92 which strip is secured to a metal flange 93 by a rivet 94, this flange preferably being integral with the strip forming the bracket 64. The opposite end 95 of the insulating strip 92 is positioned to engage the fingers 77 of the thermostat strip and prevent the flexing of this strip towards the bracket 64 and thus hold the free end of the thermostat strip firmly connected to the bracket 64 by the finger 78 and this insulating strip 92.

Therefore when the push button 86 is pressed downwardly with the elements in the position shown in Fig. 3, the contact end 90 of the stem 87 thrusts the insulating strip 92, the bracket 64 and also the thermostat strip in the direction of the arrow 82 and releases the catch 68 on the bracket from the detent 61 connected to the toggle yoke 25 and immediately allows the automatically operated part of the switch to swing to its open circuit position of Fig. 1.

It will thus be seen that if a person does not wish the delay action of the switch, when moving the finger lever 20 from the position of Fig. 2 to that of 1 or 3, they may press the button 86 inwardly at the proper time to displace the bracket 64 and its catch 68 and thus permit the bridging piece 50 to be moved from its closed circuit position of Figs. 2 and 4 to its open circuit position of Fig. 1. It will be obvious that the secondary circuit may be left closed for a short period and then the push button 86 depressed to release the catch 68 and detent 61 and thereby open the delay action circuit at any fraction of the time of its automatic action.

Various changes may be made in the details of construction without departing from the spirit or scope of the invention as defined by the appended claims.

We claim:

1. In a switch, the combination of a manually operable element movable from an open to a closed circuit position and vice versa, a pair of fixed contacts, a circuit closer connected with said element to operate automatically to close or open the circuit between the said contacts on the operation of the said element and thereby when in the closed circuit position establish a first circuit through the circuit closer, a restraining means positioned to restrain the movement of the circuit closer from its closed to its open circuit position after opening the circuit between the said contacts, means to establish a second circuit through the circuit closer when in its restrained position, and means actuated by the second circuit to disengage the restraining means and permit further movement of the circuit closer to its full open circuit position without further manipulation of the said element, means to manually displace the restraining means to permit movement of the circuit closer from its closed to its full open circuit position on movement of the said manually operated element from its closed to its open circuit position.

2. In a switch, the combination of a manually operable element movable from an open to a closed circuit position and vice versa, an automatically operating circuit closer connected therewith to give a snap action from its closed to its full open circuit position, the circuit closer having a detent, a catch normally positioned to engage the detent and restrain the movement of the circuit closer from its closed circuit to its full open circuit position, means to establish a secondary circuit when the detent and catch are engaged, means operated by the second circuit to release the catch from the detent and permit further movement of the circuit closer to its full open circuit position, a releasing means mounted on the manually operable element and having a connection to displace the catch to permit the circuit closer to move with a snap action from its closed to its full open circuit position.

3. In a switch, the combination of a manually operable switch element movable from an open to a closed circuit position and vice versa, a circuit closer interconnected with said element to be moved by a snap action from its closed to its full open circuit position, said circuit closer having a detent, a catch positioned to normally engage the detent and restrain the movement of the circuit closer from its closed to its full open circuit position, a thermostat, means to establish a secondary circuit on engagement of the detent and catch to heat the thermostat, the thermostat having a connection to the catch to release the catch at a predetermined time and thereby permit movement of the circuit closer from the catch to its full open circuit position and thereby opening the said second circuit.

4. In a switch as claimed in claim 3, a releasing device having a part mounted in the said manually operable element and normally restrained in an inoperative position, said releasing means being manually operable to its operative releasing position and a connection from the releasing means to the catch to displace the catch and thereby either remove the catch out of a position to engage the detent or to disengage the catch from the detent prior to the thermostat releasing the catch from the detent.

5. In a switch, the combination of a pair of fixed contacts, each connected in a first power circuit, a manually operable circuit closer engaging both of said contacts when in a closed circuit position, a manually operable means to move the circuit closer out of contact with both of said contacts to a full open circuit position, a restraining means to restrain the full movement of the circuit closer and maintaining said circuit closer in engagement with one of the contacts, means to form a secondary circuit through the engaged contact, the circuit closer and a thermostat, the thermostat having a connection to the restraining means to release said restraining means after a predetermined time and automatically permit movement of the circuit closer to its full open circuit position.

6. In a switch as claimed in claim 5, a releasing means, the restraining means having a catch engaging the circuit closer, means actuated by the releasing means to displace the said catch to either permit the movement of the circuit closer from its first closed circuit position engaging both contacts to its full open circuit position or to release the catch from the circuit closer.

7. In a switch, the combination of a movable circuit closer, means to form a first circuit when the circuit closer is in its circuit closing position, a spring, a manually operable switch element to tension the spring, means actuated by the spring and operatively connected to the circuit closer to move the circuit closer from its closed to its full open position, a restraining means to stop the movement of the circuit closer after a movement to open the first circuit, a second circuit established by the restrained circuit closer, and means actuated in connection with the second circuit to release the circuit closer, the said spring then being operative to continue the movement of the circuit closer to its full open position, the means actuated in connection with the second circuit including a thermostat, a heating winding for the thermostat and a connection from the thermostat to the restraining means.

8. In a switch as claimed in claim 7, a manually operable means to positively remove the restraining means out of position to engage the circuit closer, thereby permitting the circuit closer to have a movement under the influence of the spring from its closed to its full open position.

9. In a switch, the combination of a movable circuit closer, means to form a first circuit when the circuit closer is in its closed circuit position, a spring, means operated by an element of a switch to tension the spring, the spring being operatively connected to the circuit closer to move the circuit closer from its closed first circuit to its full open position after tensioning of the spring, the circuit closer having a detent, a catch positioned to engage the detent after a partial movement of the circuit closer towards its open position, means to establish a second circuit when the catch and detent engage, the second circuit including a heating coil positioned to heat a thermostat, a connection from the thermostat to the catch to release the catch from the detent and thereby permit the continued movement of the circuit closer to its full open circuit position.

10. In a switch as claimed in claim 9, the said element of the switch having a releasing device manually operable associated therewith and a connection from the releasing device to the catch to release the catch from the detent or to move the catch out of position to engage the detent.

11. In a switch, the combination of a pair of fixed contacts, a first electric circuit connected to both contacts, a movable circuit closer forming a bridging connection between the said contacts when in closed circuit position, a manually operated switch element, an automatically acting switch element connected to the manual element and to the circuit closer and operative to give a snap action in moving the circuit closer from its engagement with the contacts to its full open position, a catch, a detent on the circuit closer, the catch being positioned to engage the detent when the circuit closer opens one of the contacts and remains closed with the other contact, a second circuit through part of the circuit closer, the detent and the catch, and a thermostat having a bi-metallic strip operated by the second circuit to disengage the catch from the detent and permit the movement of the circuit closer under the influence of the automatic means to its full open circuit position.

12. In a switch, the combination of a switch housing having a pair of contacts with electric leads thereto, one of the contacts being longer than the other, an electric connection from the shorter contact, a thermostat strip secured at one end to the housing and having insulation thereon with a heating coil surrounding the insulation, one end of the coil being connected to the conducting strip, the other end of the coil being connected to the opposite end of a thermostat strip, a resilient bracket having one end secured to a housing and having its free end positioned to engage the upper end of the thermostat strip, said bracket having a catch thereon, a movable circuit closer having a bridging piece with brushes to engage the said contacts when in closed circuit position, a detent secured to the circuit closer and electrically connected to the bridging piece, the catch being positioned to engage the detent on the movement of the circuit closer from its closed to its full open position and to restrain said movement with one of the brushes in engagement with the longer contact to thereby establish a circuit through the heating coil with a return to the shorter contact.

13. In a switch as claimed in claim 12, a manually operable means to actuate the circuit closer from its closed to its full open position or vice versa, a stem slidably mounted in a manually operable means, an insulating strip connected to the bracket and engaging the upper end of the thermostat strip, a pusher means on the end of the stem to displace the insulating strip, the thermostat strip and the bracket to disengage the catch from the detent.

14. In a switch, a switch housing having a first and a second contact, the second contact being longer than the first, electrical leads connected to the contacts, a manually operable pivoted switch lever, a pivotally mounted yoke having a bridging piece connected thereto with a pair of brushes, a toggle type of interconnection between the lever and the yoke to develop a snap action in the movement of the yoke from its closed to its full open position or vice versa, the bridging piece when engaging both contacts forming a first circuit, a thermostat strip having one end secured to the housing, an insulation thereon, a heating coil wound on the insulation, the heating coil being connected at its upper end to the strip, a conductor connecting from the lower end of the coil to the first and shortest contact, a catch operatively connected to the thermostat strip, a detent electrically connected to the bridging piece to engage the detent and restrain the movement of the yoke from its first closed circuit to its full open circuit position and thereby establish a secondary circuit through the second contact and bridging piece, the detent, the catch, the thermostat strip the heating coil and the conductor back to the first contact.

15. In a switch as claimed in claim 14, the switch lever having a socket, a push button mounted therein having a stem, an insulating strip positively connected to the catch and the thermostat strip to displace the strip and the catch to release the detent from the catch, whereby the yoke may continue its movement to the full open circuit position.

THOMAS M. FIKE.
JAY BUXTON.